(12) United States Patent
Seki et al.

(10) Patent No.: US 12,092,008 B2
(45) Date of Patent: *Sep. 17, 2024

(54) EXHAUST PURIFICATION FILTER

(71) Applicant: HONDA MOTOR CO., LTD., Tokyo (JP)

(72) Inventors: Chiaki Seki, Saitama (JP); Yusuke Imai, Saitama (JP); Atsushi Furukawa, Saitama (JP); Yuichi Matsuo, Saitama (JP); Naohiro Sato, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 17/599,556

(22) PCT Filed: Mar. 13, 2020

(86) PCT No.: PCT/JP2020/011275
§ 371 (c)(1),
(2) Date: Sep. 29, 2021

(87) PCT Pub. No.: WO2020/203198
PCT Pub. Date: Oct. 8, 2020

(65) Prior Publication Data
US 2022/0193649 A1    Jun. 23, 2022

(51) Int. Cl.
*F01N 3/035*    (2006.01)
*B01D 46/00*    (2022.01)
(Continued)

(52) U.S. Cl.
CPC ......... *F01N 3/035* (2013.01); *B01D 46/0027* (2013.01); *B01D 53/9454* (2013.01);
(Continued)

(58) Field of Classification Search
None
See application file for complete search history.

(56) References Cited

U.S. PATENT DOCUMENTS

| 10,156,170 B2 | 12/2018 | Onoe et al. |
| 2014/0298779 A1 | 10/2014 | Miyairi et al. |

(Continued)

FOREIGN PATENT DOCUMENTS

| CN | 106943874 A | 7/2017 |
| CN | 107249738 A | 10/2017 |

(Continued)

OTHER PUBLICATIONS

Ishizaki et al. JP2011041933A—translated document (Year: 2011).*

(Continued)

*Primary Examiner* — Jelitza M Perez
(74) *Attorney, Agent, or Firm* — CKC & Partners Co., LLC

(57) ABSTRACT

Provided is an exhaust purification filter that is able to reduce pressure loss and that has high exhaust purification performance and particulate matter trapping performance. This exhaust purification filter comprises a filter substrate having a wall flow structure, and an exhaust purification catalyst supported on a partition wall of the filter substrate. The volume-based median pore diameter (D50) of the filter substrate is 18 μm or greater, the full width at half maximum of the pore distribution of the filter substrate is 7 μm to 15 μm, and the exhaust purification catalyst is supported in an unevenly distributed manner in a high-density layer in which the density of the exhaust purification catalyst is relatively high and a low-density layer in which the density of the exhaust purification catalyst is relatively low.

6 Claims, 10 Drawing Sheets

(51) Int. Cl.
  *B01D 53/94* (2006.01)
  *B01J 21/08* (2006.01)
  *B01J 23/10* (2006.01)
  *B01J 23/46* (2006.01)
  *B01J 35/56* (2024.01)
  *B01J 35/66* (2024.01)
  *F01N 3/022* (2006.01)
  *F01N 3/10* (2006.01)
  *B01D 46/24* (2006.01)

(52) U.S. Cl.
  CPC .............. *B01J 21/08* (2013.01); *B01J 23/10* (2013.01); *B01J 23/464* (2013.01); *B01J 35/56* (2024.01); *B01J 35/66* (2024.01); *F01N 3/022* (2013.01); *F01N 3/0222* (2013.01); *F01N 3/101* (2013.01); *B01D 46/2429* (2013.01); *B01D 46/24491* (2021.08); *B01D 46/24492* (2021.08); *B01D 2279/30* (2013.01); *F01N 2250/02* (2013.01); *F01N 2330/30* (2013.01)

(56) References Cited

U.S. PATENT DOCUMENTS

| | | |
|---|---|---|
| 2017/0122176 A1 | 5/2017 | Nomura et al. |
| 2018/0028972 A1 | 2/2018 | Kitamura et al. |
| 2018/0258810 A1 | 9/2018 | Tsuji et al. |
| 2018/0266289 A1 | 9/2018 | Otsuka et al. |
| 2018/0361299 A1 | 12/2018 | Ingram-Ogunwumi et al. |
| 2018/0363523 A1 | 12/2018 | Ingram-Ogunwumi et al. |
| 2019/0203621 A1 | 7/2019 | Seki et al. |
| 2020/0055039 A1 | 2/2020 | Kayada et al. |
| 2021/0381413 A1 | 12/2021 | Onoe et al. |

FOREIGN PATENT DOCUMENTS

| | | | |
|---|---|---|---|
| CN | 108367225 A | | 8/2018 |
| CN | 108568308 A | | 9/2018 |
| JP | 2005329404 A | | 12/2005 |
| JP | 2011041933 A | * | 3/2011 |
| JP | 2017082745 A | | 5/2017 |
| JP | 2019505365 A | | 2/2019 |
| JP | 2019506289 A | | 3/2019 |
| WO | 2017100345 A1 | | 6/2017 |

OTHER PUBLICATIONS

Office Action issued in the CN Patent Application No. 201980095178.X, mailed on Mar. 4, 2023.

Office Action issued in the CN Patent Application No. 202080026413.0, mailed on Mar. 3, 2023.

Office Action issued in the CN Patent Application No. 202080026413.0, mailed on Nov. 21, 2023.

Office Action issued in the CN Patent Application No. 201980095178.X, mailed on Nov. 22, 2023.

Office Action issued in the U.S. Appl. No. 17/599,540, mailed on Jan. 30, 2024.

* cited by examiner

EXAMPLE 1 Inlet

Outlet

EXAMPLE 2 Inlet

Outlet

EXAMPLE 3 Inlet

Outlet

EXAMPLE 4 Inlet

Outlet

EXAMPLE 5 Inlet

Outlet

EXAMPLE 6 Inlet

Outlet

EXAMPLE 7 Inlet

Outlet

EXAMPLE 8 Inlet

Outlet

EXAMPLE 9 Inlet

Outlet

COMPARATIVE Inlet
EXAMPLE 1

Outlet

COMPARATIVE EXAMPLE 2

COMPARATIVE EXAMPLE 3

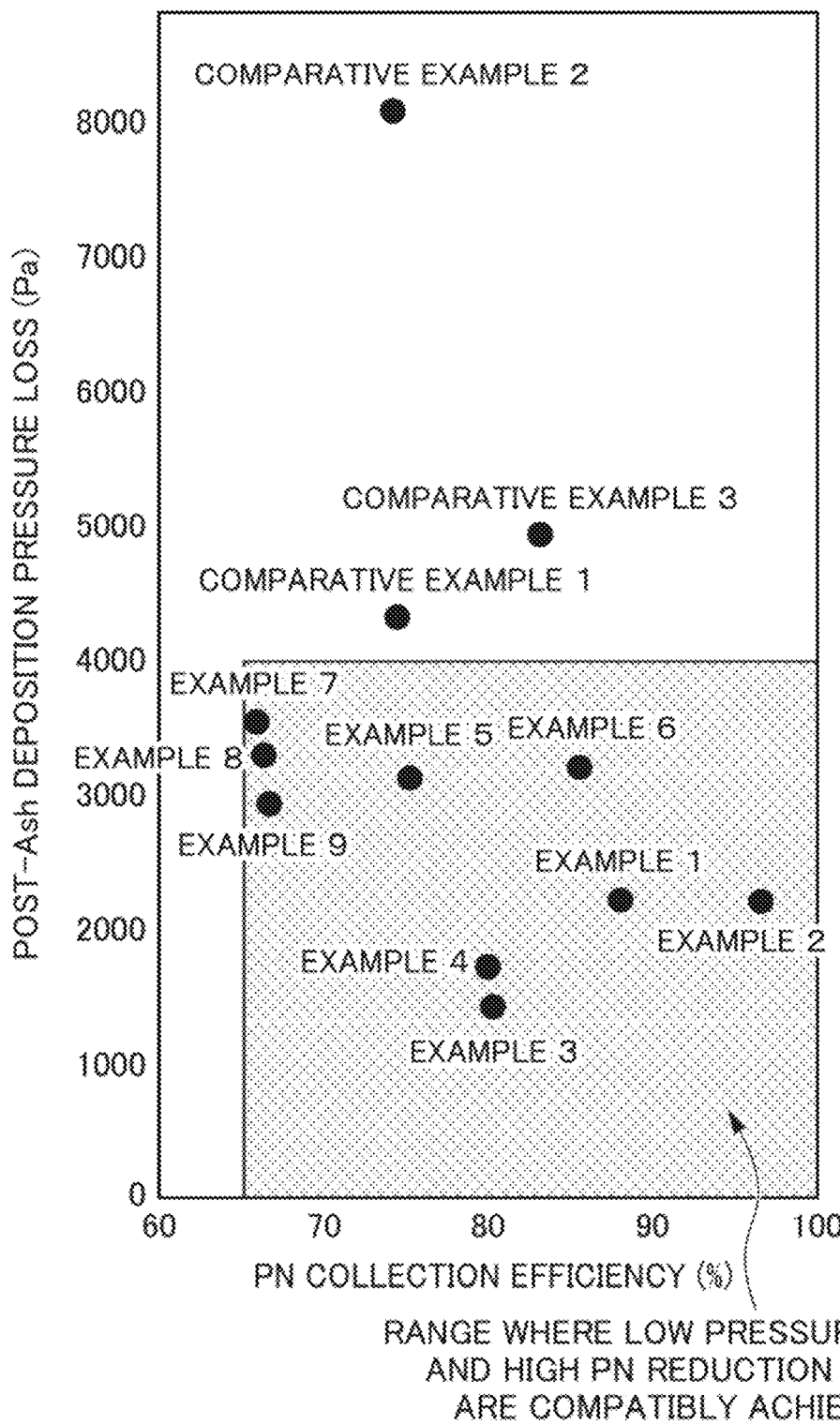

EXHAUST PURIFICATION FILTER

TECHNICAL FIELD

The present invention relates to an exhaust purification filter including an exhaust purification catalyst.

BACKGROUND ART

Conventionally, from the viewpoint of improving combustion efficiency, direct-injection gasoline engines have been increasingly employed as gasoline engines mountable on automobiles and the like. However, the direct-injection gasoline engine emits a larger quantity of particulates including particulate matter (PM), than a port-injection (PI) engine. In response to the recent tightening of emission regulations (PM emission regulations and regulations on the particle number of emitted particles (PN regulations)), studies are being conducted on technologies to install an exhaust purification filter for filtering particulate matter (gasoline particulate filter, hereinafter referred to as "GPF") in an exhaust passage of a gasoline engine.

An exhaust passage of a gasoline engine is provided with a three-way catalyst (hereinafter, referred to as "TWC") for purifying CO, HC, and NOx contained in the exhaust, the three-way catalyst being supported on a honeycomb support member. Especially in recent years, two or more TWCs are arranged in series in an exhaust passage in order to fulfill required catalytic purification performance. From the viewpoint of pressure loss and costs, it is not preferable to newly install a GPF in addition to these two or more TWCs in an exhaust passage.

To address this, a technique has been proposed by which a TWC is supported on a GPF so that a three-way purification function is additionally imparted to the GPF, which has particulate matter-filtering performance (see, for example, Patent Document 1).

Patent Document 1: Japanese Unexamined Patent Application, Publication No. 2017-082745

DISCLOSURE OF THE INVENTION

Problems to be Solved by the Invention

However, in order to achieve desired particulate matter-filtering performance, it is necessary to use a material having small pores as a filter substrate forming the GPF. Use of such a material gives rise to a problem of an increase in pressure loss, which leads to a decrease in output. Further, this problem is further remarkable since more particulate matter, such as oil-derived ash (ash), is filtered by the exhaust purification filter as mileage accumulates.

There is a method of improving particulate matter-filtering performance by way of application of a coating of a catalyst. However, in a case where a catalyst is supported on a filter substrate having the conventional pore size, the amount of the catalyst supported on the GPF is limited from the above-mentioned viewpoint of the pressure loss, and the exhaust purification performance cannot be expected to be as good as that of the conventional TWC. In other words, the pressure loss, and the exhaust purification performance and the particulate matter-filtering performance have a trade-off relationship with respect to each other.

The present invention has been achieved in view of the foregoing background. It is an object of the present invention to provide an exhaust purification filter that has high exhaust purification performance and high particulate matter-filtering performance, while being capable of reducing a pressure loss.

Means for Solving the Problems

To achieve the above object, a first aspect of the present invention provides an exhaust purification filter (e.g., a GPF 32 to be described later) installable in an exhaust passage (e.g., an exhaust pipe 3 to be described later) of an internal combustion engine (e.g., an engine 1 to be described later), the exhaust purification filter purifying exhaust of the internal combustion engine by filtering particulate matter contained in the exhaust. The exhaust purification filter includes: a filter substrate (e.g., a filter substrate 320 to be described later) including a plurality of cells that extend from an inflow-side end face corresponding inflow of the exhaust to an outflow-side end face corresponding outflow of the exhaust, and that are partitioned and defined by a porous partition wall (e.g., a partition wall 323 to be described later), the plurality of cells including an inflow cell that has a plugged opening at the outflow-side end face and an outflow cell that has a plugged opening at the inflow-side end face, the inflow cell and the outflow cell being arranged alternately with each other; and an exhaust purification catalyst (e.g., a TWC 33 to be described later) supported on the partition wall. The filter substrate has a median pore diameter (D50) by volume equal to or greater than 18 µm. The filter substrate has a half-width of pore distribution ranging from 7 µm to 15 µm. The exhaust purification catalyst is non-uniformly distributed and supported in a high density layer (e.g., a high density layer 331 to be described later) in which the exhaust purification catalyst is disposed at a relatively high density and a low density layer (e.g., a low density layer 332 to be described later) in which the exhaust purification catalyst is disposed at a relatively low density.

The exhaust purification filter according to the first aspect of the present invention includes the filter substrate of the so-called wall flow type and the exhaust purification catalyst supported on the filter substrate. In the exhaust purification filter of the first aspect, the median pore diameter of the filter substrate is relatively large, i.e., 18 µm or greater, and the exhaust purification catalyst supported on the filter substrate is non-uniformly distributed in the high density layer having a relatively high density and the low density layer having a relatively low density. According to the first aspect, the exhaust purification filter has, in a portion in a thickness direction of the partition wall having pores with a relatively large pore diameter, the high density layer in which the exhaust purification catalyst is disposed at a high density in the form of a layer. This feature ensures sufficient flow paths of the exhaust and uniformity in the flow of the exhaust. As a result, an increase in pressure loss can be reduced within a permissible range. Here, the present applicant has made the findings that an increase in pressure loss caused at an initial stage by particulate matter is correlated with an increase in pressure loss after deposition of the particulate matter. In other words, if the increase in pressure loss caused at the initial stage by the particulate matter can be reduced, the increase in pressure loss after the deposition of the particulate matter can also be reduced. In this regard, since the first aspect exerts the above-described effect of reducing an increase in pressure loss from an initial stage, the first aspect is capable of reducing an increase in pressure loss after the deposition of the particulate matter.

Further, according to the first aspect, since the exhaust purification filter has, in a portion in the thickness direction of the partition wall, the high density layer in which the exhaust purification catalyst is disposed at a high density in the form of a layer, it is ensured that the exhaust flows through the flow paths narrowed by the exhaust purification catalyst disposed at a high density, whereby high particulate matter-filtering performance and high exhaust purification performance can be achieved. Thus, the first aspect of the present invention is capable of reducing an increase in pressure loss caused at the initial stage by the particulate matter, and reducing an increase in pressure loss after the deposition of the particulate matter. This means that the first aspect of the present invention can reduce the pressure loss without limiting an amount of the supported exhaust purification catalyst. Thus, the first aspect provides the exhaust purification filter that has high exhaust purification performance and high particulate matter-filtering performance, while enabling a reduction of pressure loss.

Further, according to the first aspect of the present invention, the half-width of a peak of pore distribution of the filter substrate ranges from 7 μm to 15 μm. That is, the exhaust purification filter according to the first aspect has pores with a large diameter, while the half-width of the pore distribution is narrow. Due to this feature, when the exhaust purification catalyst is supported onto the filter substrate, a slurry containing the exhaust purification catalyst preferentially flows into pores having a small pore diameter due to a capillary phenomenon, so that the pores can be inhibited from being blocked. Accordingly, also after the catalyst is supported, the exhaust flow paths in the partition wall are inhibited from decreasing in number. Thus, the exhaust purification filter can be provided which is capable of further reducing an increase in pressure loss in a state where the catalyst is supported. Further, since many flow paths are present, the probability of contact of the particulate matter-containing exhaust with the exhaust purification catalyst increases. Thus, the exhaust purification filter can be provided which has higher exhaust purification performance and higher particulate matter-filtering performance.

A second aspect of the present invention is an embodiment of the first aspect. In the exhaust purification filter of the second aspect, the high density layer may be disposed on an outer surface of the partition wall.

According to the second aspect, the high density layer in which the exhaust purification catalyst is disposed at a high density is disposed on the outer surface (the surface on an exhaust inlet side and the surface of an exhaust outlet side) of the partition wall. Due to this feature, the pore diameters of the pores in the partition wall can be inhibited from being narrowed by the exhaust purification catalyst, whereby the exhaust flow paths can be ensured further sufficiently. Thus, the exhaust purification filter according to the second aspect of the present invention has higher exhaust purification performance and higher particulate matter-filtering performance, while enabling a further reduction of pressure loss.

A third aspect of the present invention is an embodiment of the first or second aspect. In the exhaust purification filter of the third aspect, the high density layer may include the exhaust purification catalyst in an amount constituting 50% by mass or more of a total amount of the exhaust purification catalyst supported on the partition wall.

According to the third aspect, the high density layer includes the exhaust purification catalyst in an amount constituting 50% by mass or more of the exhaust purification catalyst supported on the partition wall. This feature further enhances the effects of the first and second aspects.

A fourth aspect of the present invention is an embodiment of any one of the first to third aspects. In the exhaust purification filter of the fourth aspect, the high density layer may be disposed on an outer surface of an outlet side of the partition wall, the outlet side allowing the exhaust that has flowed into the partition wall to flow out.

According to the fourth aspect, the high density layer in which the exhaust purification catalyst is disposed at a high density is disposed on the outer surface of the outlet side of the partition wall. Due to this feature, the pores adjacent to the inlet side are allowed to maintain their large pore diameters, in comparison with a case where the high density layer is disposed on an outer surface of the inlet side. As a result, an increase in pressure loss can be reduced when the exhaust flows from an airflow layer into the partition wall. Further, on the outlet side of the partition wall through which the exhaust flows out, the probability of contact of the exhaust with the exhaust purification catalyst increases. Thus, the exhaust purification filter is provided which has both high exhaust purification performance and high particulate matter-filtering performance.

A fifth aspect of the present invention is an embodiment of the first aspect. In the exhaust purification filter of the fifth aspect, the high density layer may be disposed within the partition wall.

According to the fifth aspect, the high density layer in which the exhaust purification catalyst is disposed at a high density is disposed within the partition wall. Thus, since the high density layer is disposed in a portion in the thickness direction of the partition wall, the flow paths (pore diameters) are narrowed by the exhaust purification disposed at a high density. Consequently, it is further ensured that the exhaust flows through the narrowed flow paths. Thus, higher particulate matter-filtering performance and higher exhaust purification performance can be achieved.

A sixth aspect of the present invention is an embodiment of the fifth aspect. In the exhaust purification filter of the sixth aspect, the high density layer may be one of four layers formed by imaginarily dividing the partition wall in a thickness direction into four equal parts, and the high density layer may include the exhaust purification catalyst in an amount constituting 50%, by mass or more of a total amount of the exhaust purification catalyst supported on the partition wall.

In the sixth aspect, the high density layer is one of the four layers formed by imaginarily dividing the partition wall in the thickness direction into four parts, and the high density layer includes the exhaust purification catalyst in an amount constituting 50% by mass or more of the exhaust purification catalyst supported on the partition wall. This feature further enhances the effects of the first and fifth aspects.

A seventh aspect of the present invention is an embodiment of the sixth aspect. In the exhaust purification filter of the seventh aspect, the high density layer may be one of the four layers that is closest to an outlet side of the partition wall, the outlet side allowing the exhaust that has flowed into the partition wall to flow out.

According to the seventh aspect, the high density layer in which the exhaust purification catalyst is disposed at a high density is disposed closest to the outlet side of the partition wall. Due to this feature, the pores adjacent to the inlet side of the partition wall are allowed to maintain their large pore diameters, in comparison with a case where the high density layer is disposed on the inlet side of the partition wall. As a result, an increase in pressure loss can be reduced when the exhaust flows from the airflow layer into the partition wall. Further, on the outlet side of the partition wall through which the exhaust flows out, the probability of contact of the exhaust with the exhaust purification catalyst increases. Thus, the exhaust purification filter is provided which has both high exhaust purification performance and high particulate matter-filtering performance.

An eighth aspect of the present invention is an embodiment of any one of the first to seventh aspects. In the exhaust purification filter of the eighth aspect, the half-width of the pore distribution of the filter substrate may range from 7 μm to 9 μm.

In the eighth aspect, the half-width of the peak of the pore distribution of the filter substrate ranges from 7 μm to 9 μm. This feature further enhances the effects of the first to seventh aspects.

A ninth aspect of the present invention is an embodiment of any one of the first to eighth aspects. In the exhaust purification filter of the ninth aspect, the filter substrate may have a porosity equal to or greater than 63%.

In the ninth aspect, the porosity of the filter substrate is equal to or greater than 63%. This feature further sufficiently ensures the flow paths of the exhaust, thereby further enhancing the effects of the first to eighth aspects.

A tenth aspect of the present invention is an embodiment of any one of the first to ninth aspects. In the exhaust purification filter of the tenth aspect, the median pore diameter (D50) by volume of the filter substrate may be equal to or greater than 20 μm.

In the tenth aspect, the median pore diameter (D50) by volume of the filter substrate is equal to or greater than 20 μm. This feature further enhances the effects of the first to ninth aspects.

An eleventh aspect of the present invention is an embodiment of any one of the first to tenth aspects. In the eleventh aspect, the exhaust purification catalyst may be a three-way catalyst, and the exhaust purification filter may be a GPF.

In the eleventh aspect, the exhaust purification filter of the first to tenth aspect is applied to the GPF, and the three-way catalyst is used as the exhaust purification catalyst. This feature makes it possible to purify CO, HC, NOx, and particulate matter in the exhaust at a high purification ratio, while reducing the pressure loss.

Effects of the Invention

The present invention provides the exhaust purification filter that has high exhaust purification performance and high particulate matter-filtering performance, while being capable of reducing a pressure loss.

BRIEF DESCRIPTION OF THE DRAWINGS

FIG. 17 is a diagram illustrating a relationship between particulate matter collection efficiency and post-ash deposition pressure loss, with respect to the GPFs of Examples 1 to 9 and Comparative Examples 1 to 3, the relationship having been determined in an actual vehicle.

PREFERRED MODE FOR CARRYING OUT THE INVENTION

An embodiment of the present invention will be described in detail with reference to the drawings.

Figure 1:
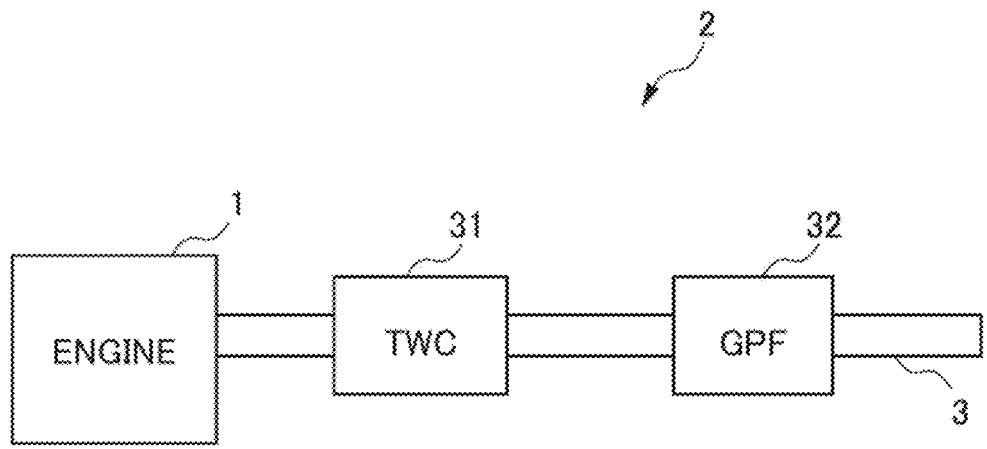
FIG. 1 is a diagram illustrating a configuration of an exhaust purification device of an internal combustion engine according to an embodiment of the present invention.

FIG. 1 is a diagram illustrating a configuration of an exhaust purification device 2 of an internal combustion engine 1 (hereinafter, referred to as "engine 1") according to the present embodiment. The engine 1 is a direct injection type gasoline engine. As illustrated in FIG. 1, the exhaust purification device 2 includes an exhaust pipe 3 through which exhaust flows, a TWC 31, and a GPF 32 as an exhaust purification filter. The TWC 31 and the GPF 32 are arranged in this order from an upstream side of the exhaust pipe 3.

The TWC 31 purifies exhaust by oxidizing HC contained in the exhaust to $H_2O$ and $CO_2$, CO contained in the exhaust to $CO_2$, and reducing NOx contained in the exhaust to $N_2$. The TWC 31 includes, for example: a support made of an oxide, such as alumina, silica, zirconia, titania, ceria, or zeolite; and a noble metal, such as Pd or Rh, functioning as a catalytic metal and supported on the support. The TWC 31 is usually supported on a honeycomb support member.

The TWC 31 further includes an OSC material having an OSC. Examples for use as the OSC material include a composite oxide of $CeO_2$ and $ZrO_2$ (hereinafter, referred to as "CeZr composite oxide") as well as $CeO_2$. Among these examples, the CeZr composite oxide is preferably used because it is highly durable. Note that the above-mentioned catalytic metal may be supported on these OSC materials.

The TWC 31 may be prepared by any process. For example, a known slurry process or the like may be employed. For example, the TWC 31 can be prepared by a process including: preparing a slurry containing the above-mentioned oxide, noble metal, OSC material, and other constituents; and coating a honeycomb support member made of cordierite with the prepared slurry, followed by sintering.

The GPF 32 purifies exhaust by filtering particulate matter contained in the exhaust. Specifically, when the exhaust passes through fine pores in a partition wall to be described later, the particulate matter is deposited on a surface of the partition wall, whereby the particulate matter is filtered.

Here, the particulate matter as used herein includes particulates such as soot (carbon soot), an unburnt residue of oil (SOF), ash as cinders of oil, and PM. In recent years, the emission regulations on the particulate matter including these particulates are becoming more stringent. Not only regulations on the total emission weight (g/km, g/kW) of the particulate matter (PM regulations), but also regulations on the number of emitted fine particulates (PN regulations) concerning, for example, PM 2.5 having a particle diameter of 2.5 μm or less are imposed. To address this, the GPF 32 according to the present embodiment is configured to meet the PM regulations and the PN regulations.

Figure 2:
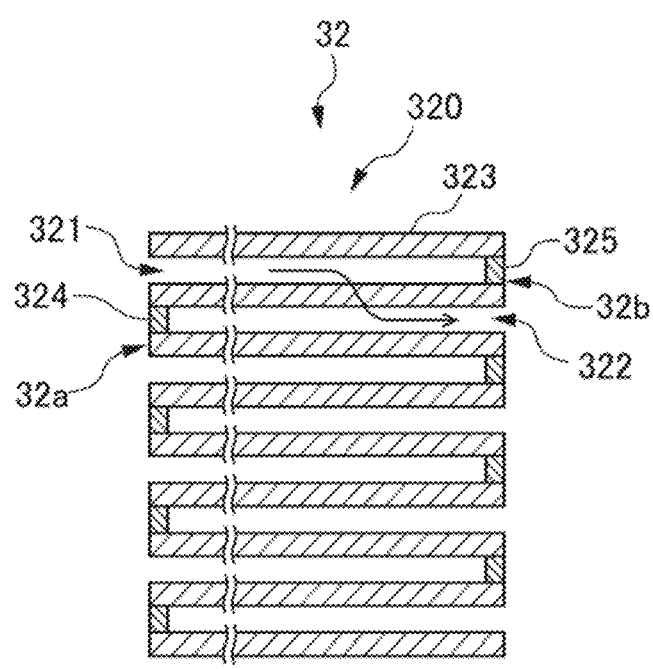
FIG. 2 is a diagram schematically illustrating a cross section of a GPF according to the embodiment.

FIG. 2 is a diagram schematically illustrating a cross section of the GPF 32 according to the present embodiment. As illustrated in FIG. 2, the GPF 32 includes a filter substrate 320, an exhaust purification catalyst (a TWC 33 in the present embodiment) that is supported on partition walls 323 of the filter substrate 320. The filter substrate 320 has, for example, a circular column shape that is long in an axial direction, and is made of a porous material, such as cordierite, mullite, or silicon carbide (SiC). The filter substrate 320 includes a plurality of cells that extend from an inflow-side end face 32a to an outflow-side end face 32b, and are partitioned and defined by the partition walls 323.

The filter substrate 320 is provided with inflow-side plug members 324 that plug openings at the inflow-side end face 32a. Part of the cells have, at the inflow-side end face 32a, an opening plugged with the inflow-side plug member 324. These cells each have a closed inflow-side end, while having an open outflow-side end, and each constitute an outflow cell 322 that allows exhaust that has penetrated the partition wall 323 to flow thereout toward a downstream side. The inflow-side plug members 324 are formed by charging plugging cement from the inflow-side end face 32a of the filter substrate 320.

The filter substrate 320 is provided with outflow-side plug members 325 that plug openings at the outflow-side end face 32b. Another part of the cells have, at the outflow-side end face 32b, an opening plugged with the outflow-side plug member 325. These cells each have an open inflow-side end, while having a closed outflow-side end, and each constitute an inflow cell 321 into which the exhaust flows from the exhaust pipe 3. The outflow-side plug members 325 are formed by charging plugging cement from the outflow-side end face 32b of the filter substrate 320.

The cells' openings at the inflow-side end face 32a and the cells' openings at the outflow-side end face 32b are plugged in a staggered manner, so that the inflow cells 321 having the plugged openings at the outflow-side end face 32b are arranged alternately with the outflow cells 322 having the plugged openings at the inlet-side end face 32a. More specifically, the inflow cells 321 and the outflow cells 322 are arranged adjacent to each other in a grid pattern (checkered pattern).

As indicated by the arrow in FIG. 2, the exhaust flows into the inflow cell 321, and then flows into the partition wall 323 from an airflow layer. Thereafter, the exhaust passes through the partition wall 323 to flow into the outflow cell 322. The side through which the exhaust flows into the partition wall 323 is defined as an inlet side (Inlet), while the side through which the exhaust flows out of the partition wall 323 is defined as an outlet side (Outlet).

Figure 3A:
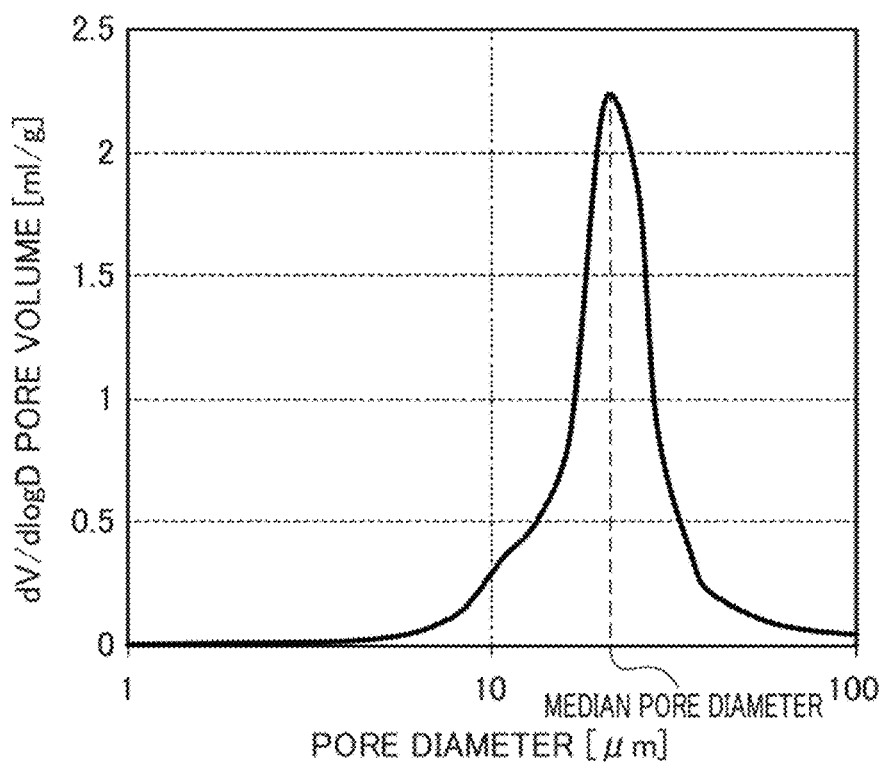
FIG. 3A is a graph illustrating, as an example, pore distribution in a filter substrate according to the embodiment.

FIG. 3A is a graph illustrating, as an example, pore distribution in the filter substrate 320 according to the present embodiment. The pore distribution is measured by an Hg porosimeter. In FIG. 3A, the horizontal axis represents the pore diameter (μm), and the vertical axis represents Log differential of pore volume distribution, dV/d(log D) (ml/g). As is apparent from FIG. 3A, the filter substrate 320 has a median pore diameter (D50) by volume equal to or greater than 18 μm. More preferably, the median pore diameter (D50) by volume is 20 μm or greater.

That is, the filter substrate 320 of the present embodiment has relatively large pores, the median pore diameter of which is 18 μm or more. With this configuration, sufficient flow paths are ensured for the exhaust flowing into the partition wall 323. Especially, as will be described later, the position where the exhaust purification catalyst (TWC 33) is supported in the present embodiment has been devised in such a way that the pore diameters of the pores in the filter substrate 320 are inhibited from being narrowed (blocked) by the exhaust purification catalyst (TWC 33). Consequently, the sufficient flow paths are ensured for the exhaust, thereby making it possible to reduce a pressure loss.

Figure 3B:
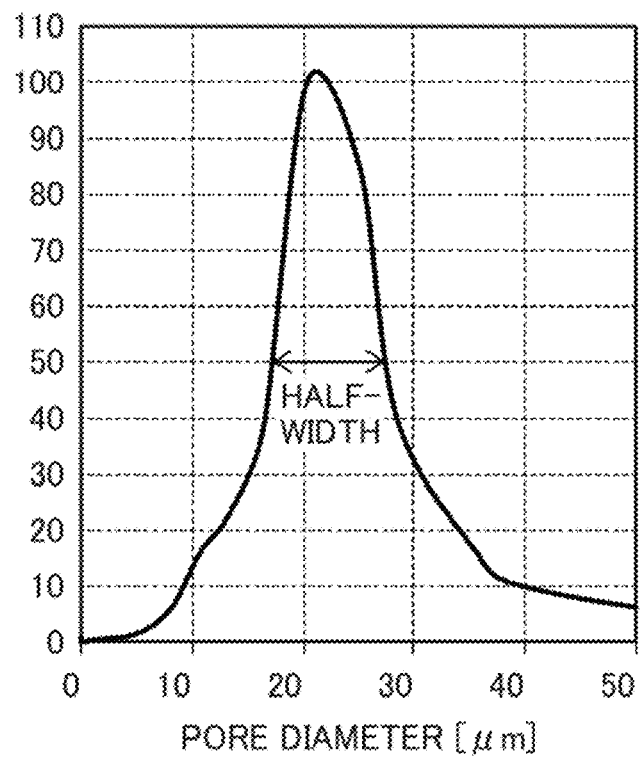
FIG. 3B is a plot in which the maximum Log differential of the pore volume distribution (dV/d(log D) (ml/g)) of FIG. 3A is normalized as 100.

FIG. 3B is a plot in which the maximum Log differential of the pore volume distribution (dV/d(log D)(ml/g)) of FIG. 3A is normalized as 100. FIG. 3B shows a half-width that is an index representing a degree of sharpness of a peak of the pore distribution. For the filter substrate 320 according to the present embodiment, the half-width preferably ranges from 7 μm to 15 μm. More preferably, the half-width ranges from 7 μm to 9 μm.

That is, the filter substrate 320 of the present embodiment has pores with a large diameter, while the half-width of the pore distribution is narrow. Setting the half-width to 7 μm to 15 μm leads to the following. When the exhaust purification catalyst (TWC 33) is supported onto the filter substrate 320, a slurry containing the exhaust purification catalyst (TWC 33) preferentially flows into pores having a small pore diameter due to a capillary phenomenon, so that the pores can be inhibited from being blocked. Accordingly, also after the catalyst is supported, the exhaust flow paths in the partition walls 323 are inhibited from decreasing in number. Thus, the GPF 32 can be provided which is capable of further reducing an increase in pressure loss in a state where the catalyst is supported. Further, since many flow paths are present, the probability of contact of the particulate matter-containing exhaust with the exhaust purification catalyst (TWC 33) increases. As a result, higher exhaust purification performance and higher particulate matter-filtering performance can be achieved.

The filter substrate 320 preferably has a porosity equal to or greater than 63%. Setting the porosity of the filter substrate 320 to 63% or greater makes it possible to inhibit the pressure loss from rapidly increasing when the exhaust purification catalyst (TWC 33) is supported onto the filter substrate 320.

Figure 4A:
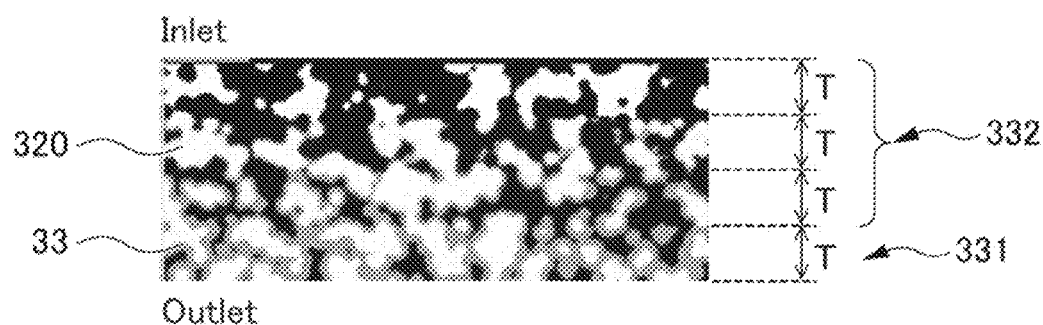
FIG. 4A shows, as an example, an image of a cross section of a GPF according to the embodiment.

FIG. 4A shows, as an example, an image of a cross section of the GPF 32 according to the present embodiment. In FIG. 4A, white portions represent the filter substrate 320, black portions represent the pores, and gray portions represent the TWC (three-way catalyst) 33 as the exhaust purification catalyst. The upper side of FIG. 4A is the inlet side (Inlet) of the partition wall 323, while the lower side is the outlet side (Outlet) of the partition wall 323. Note that this denotation also applies to all the images to be described later.

In the example shown in FIG. 4A, a high density layer 331 in which the TWC 33 is supported at a high density is disposed as a layer constituting 25% in a thickness direction from the outlet side of the partition wall 323 (i.e., as the layer closest to the outlet side among four layers formed by dividing the partition wall 323 in the thickness direction into four equal parts each having a thickness T). Thus, in the GPF 32 of the present embodiment, the exhaust purification catalyst (TWC 33) is non-uniformly distributed and supported in the high density layer 331 having a relatively high density and low density layers 332 having a relatively low density.

As can be seen, the GPF 32 of the present embodiment has, in a portion in the thickness direction of the partition wall 323 having pores with a relatively large pore diameter, the high density layer 331 in which the exhaust purification catalyst (TWC 33) is disposed at a high density in the form of a layer. This configuration ensures the sufficient flow paths of the exhaust as well as uniformity in the flow of the exhaust. As a result, an increase in pressure loss can be reduced within a permissible range. Here, the present applicant has made the findings that an increase in pressure loss caused at an initial stage by particulate matter is correlated with an increase in pressure loss after deposition of the particulate matter. In other words, if the increase in pressure loss caused at the initial stage by the particulate matter can be reduced, the increase in pressure loss after the deposition of the particulate matter can also be reduced. In this regard, since the above-described effect of reducing an increase in pressure loss is exerted from an initial stage, the present embodiment is capable of reducing an increase in pressure loss after the deposition of the particulate matter.

Further, the present embodiment ensures that the exhaust flows through the flow paths narrowed by the exhaust purification catalyst (TWC 33) disposed at a high density, so that high particulate matter-filtering performance and high exhaust purification performance can be achieved. Therefore, the present embodiment is capable of reducing an increase in pressure loss caused at an initial stage by particulate matter, and reducing an increase in pressure loss after the deposition of the particulate matter. This means that the present embodiment can reduce the pressure loss without limiting the amount of the supported exhaust purification catalyst (TWC 33), thereby enabling not only a reduction of pressure loss, but also high exhaust purification performance and high particulate matter-filtering performance.

As in the example shown in FIG. 4A, the high density layer 331, in which the exhaust purification catalyst (TWC 33) is disposed at a high density, is closest to the outlet side of the partition wall 323. With this configuration, the pores adjacent to the inlet side are allowed to maintain their large pore diameters, in comparison with a case where the high density layer is disposed on the inlet side of the partition wall 323. As a result, an increase in pressure loss can be reduced when the exhaust flows from the airflow layer into the partition wall 323. Further, on the outlet side of the partition wall 323 through which the exhaust flows out, the probability of contact of the exhaust with the exhaust purification catalyst (TWC 33) increases. Thus, high exhaust purification performance and high particulate matter-filtering performance can be achieved. However, the position of the high density layer 331 is not limited to the position described above. The high density layer 331 may be positioned in any one of the four imaginarily divided layers.

Figure 4B:
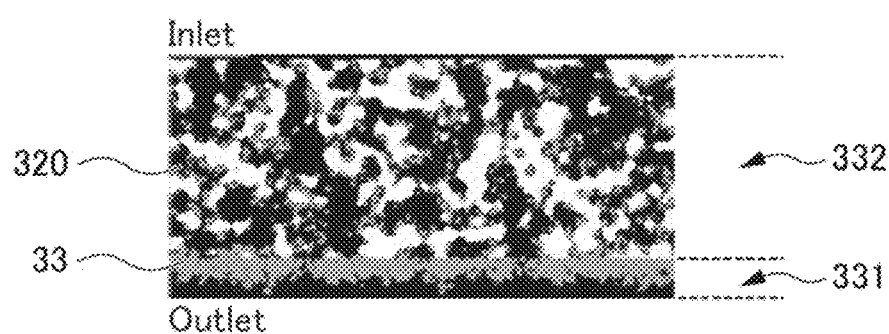
FIG. 4B shows, as another example, an image of a cross section of a GPF according to the embodiment.
Figure 5:
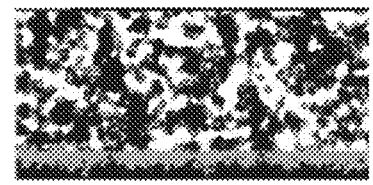
FIG. 5 is an image of a cross section of a GPF according to Example 1.
Figure 6:
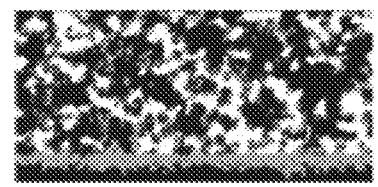
FIG. 6 is an image of a cross section of a GPF according to Example 2.
Figure 7:
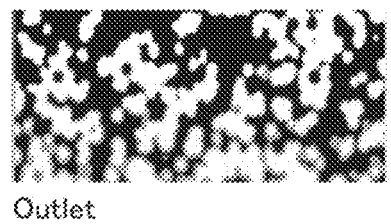
FIG. 7 is an image of a cross section of a GPF according to Example 3.
Figure 8:
FIG. 8 is an image of a cross section of a GPF according to Example 4.
Figure 9:
FIG. 9 is an image of a cross section of a GPF according to Example 5.
Figure 10:
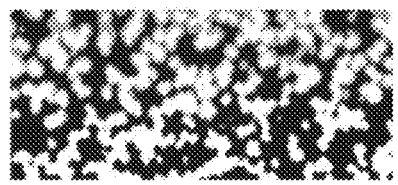
FIG. 10 is an image of a cross section of a GPF according to Example 6.
Figure 11:
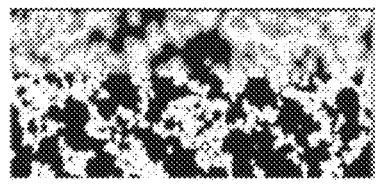
FIG. 11 is an image of a cross section of a GPF according to Example 7.
Figure 12:
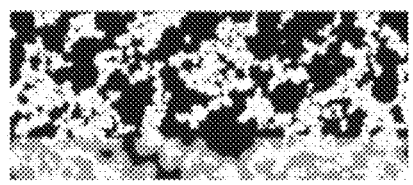
FIG. 12 is an image of a cross section of a GPF according to Example 8.
Figure 13:
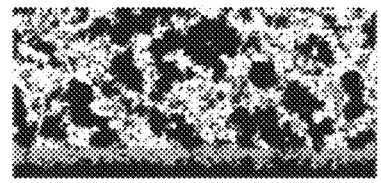
FIG. 13 is an image of a cross section of a GPF according to Example 9.
Figure 14:
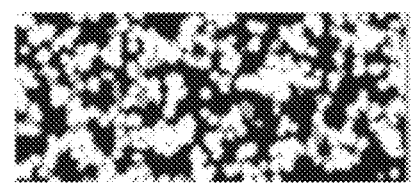
FIG. 14 is an image of a cross section of a GPF according to Comparative Example 1.
Figure 15:
FIG. 15 is an image of a cross section of a GPF according to Comparative Example 2.
Figure 16:
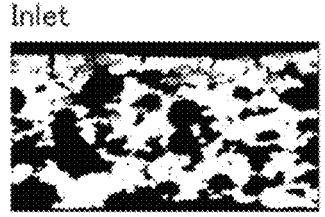
FIG. 16 is an image of a cross section of a GPF according to Comparative Example 3.

Next, reference is made to FIG. 4B showing, as another example, an image of a cross section of a GPF 32 according to the present embodiment. In the example shown in FIG. 4B, a high density layer 331 in which the exhaust purification catalyst (TWC 33) is disposed at a high density in the form of a layer is not positioned within the partition wall 323, but on an outer surface of the partition wall 323. More specifically, the high density layer 331 is disposed on the outer surface of the outlet side of the partition wall 323.

In the example shown in FIG. 4B, the pore diameters of the pores in the partition wall 323 can be inhibited from being narrowed by the exhaust purification catalyst (TWC 33). Thus, the exhaust flow paths can be ensured further sufficiently. Accordingly, the pressure loss can be further reduced, and higher exhaust purification performance and higher particulate matter-filtering performance can be achieved. Further, the high density layer 331, in which the exhaust purification catalyst (TWC 33) is disposed at a high density, is provided on the outer surface of the outlet side of the partition wall 323. With this configuration, the pores adjacent to the inlet side are allowed to maintain their large pore diameters, in comparison with a case where the high density layer is disposed on the outer surface of the inlet side. As a result, an increase in pressure loss can be reduced when the exhaust flows from the airflow layer into the partition wall 323. Further, on the outlet side of the partition wall 323 through which the exhaust flows out, the probability of contact of the exhaust with the exhaust purification catalyst (TWC 33) increases. Thus, high exhaust purification performance and high particulate matter-filtering performance can be achieved. Note that the high density layer 331 may be disposed on the outer surface of the inlet side.

It is preferable that each of the above-described high density layers 331 includes the exhaust purification catalyst (TWC 33) in an amount constituting 50% by mass or more of the total amount of the exhaust purification catalyst (TWC 33) supported on one partition wall 323. This feature allows the above-described effects to be more reliably exerted, and makes it possible to achieve not only a further reduction of pressure loss, but also higher exhaust purification performance and higher particulate matter-filtering performance.

Like the TWC 31 described above, the TWC 33 purifies exhaust by oxidizing HC contained in the exhaust to $H_2O$ and $CO_2$, CO contained in the exhaust to $CO_2$, and reducing NOx contained in the exhaust to $N_2$. The TWC 33 includes, for example: a support made of an oxide, such as alumina, silica, zirconia, titania, ceria, or zeolite; and a noble metal, such as Pd or Rh, functioning as a catalytic metal and supported on the support.

The TWC 33 further includes an OSC material (oxygen absorbing-desorbing material). Examples for use as the OSC material include a composite oxide of $CeO_2$ and $ZrO_2$ (hereinafter, referred to as "CeZr composite oxide") as well as $CeO_2$. Among these examples, the CeZr composite oxide is preferably used because it is highly durable. Note that the above-mentioned catalytic metal may be supported on these OSC materials. In order to cause the above-described TWC to effectively exert its catalytic actions at the same time, it is preferable to maintain a ratio between fuel and air (hereinafter referred to as "air-fuel ratio") in proximity to a stoichiometric ratio obtainable in the case of a complete combustion reaction (hereinafter referred to as "stoichiometric ratio"). Using the OSC material, which is capable of absorbing and storing oxygen under an oxidizing atmosphere and is capable of desorbing oxygen under a reducing atmosphere, as an auxiliary catalyst in combination with the catalytic metal makes it possible to achieve higher catalytic purification performance.

The TWC 33 may be prepared by any process. For example, a known slurry process or the like may be employed. For example, the TWC 33 can be prepared by a process including: preparing a slurry containing the above-mentioned oxide, noble metal, OSC material, and other constituents; and coating the filter substrate 320 with the prepared slurry, followed by sintering.

The TWC 33 having the configuration described above is preferably contained in an amount of 30 g/L to 150 g/L in washcoat. If the amount of the TWC 33 contained in the washcoat is within this range, high catalytic purification performance and high particulate matter-filtering performance can be achieved, while reducing an increase in pressure loss. Note that the TWC 33 of the present embodiment may contain other noble metals, such as Pt, as a catalytic metal.

The GPF 32 of the present embodiment having the above-described configuration is produced, for example, by a piston-push-up process. According to the piston-push-up process, a slurry containing a predetermined amount of constituent materials of the exhaust purification catalyst is prepared by milling, and the exhaust purification catalyst in a WC amount of 60 g/L is supported onto the filter substrate 320 by the piston-push-up process, while the inflow-side end face of the filter substrate 320 is used as an inlet of the slurry. Thereafter, drying and sintering are performed, thereby producing the GPF 32.

Examples of a method of forming (disposing) the high density layer in a surface layer of the filter substrate 320 include a method according to which the filter substrate 320 is impregnated with a slurry having a high viscosity, while a suction pressure is set to a low pressure. The examples further include a method according to which milling is performed for a short time at the time of preparation of a slurry so that the resultant slurry in which relatively large particles remain is used. Examples of a method of forming (disposing) the high density layer on the inlet side/outlet side of the partition wall 323 of the filter substrate 320 include a method according to which the filter substrate 320 is impregnated with a slurry having a high viscosity, while a suction pressure is set to a high pressure. Examples of a method of forming (disposing) the high density layer in a middle portion of the filter substrate 320 in the thickness direction include a method according to which the filter substrate 320 is impregnated with a slurry having a low viscosity, while a suction time is set to a short time.

Note that the present invention is not limited to the embodiment described above, but encompasses variations and improvements that are made within the range where the object of the present invention can be achieved. In the embodiment described above, the exhaust purification filter according to the present invention is applied to the GPF. However, this is a non-limiting example. The exhaust purification filter according to the present invention may be applied to a DPF. In this case, the exhaust purification catalyst is not limited to the TWC, and other exhaust purification catalysts may be used. For example, an oxidation catalyst, such as a PM combustion catalyst, may be used.

EXAMPLES

Next, examples of the present invention will be described. It should be noted that the present invention is not limited to the following examples.

Examples 1 to 9, Comparative Examples 1 to 3

First, an aqueous solution of Pd nitrate and Rh nitrate and an $Al_2O_3$ support (commercially available γ-alumina) were charged into an evaporator. The $Al_2O_2$ support was impregnated with Pd and Rh, so that Pd and Rh were supported onto the $Al_2O_3$ support at a mass ratio of 6/1. Subsequently, following drying, sintering was performed at 600° C., whereby a Pd—Rh/$Al_2O_3$ catalyst was produced. Pd nitrate and Rh nitrate, and $CeO_2$ were prepared in the same manner, whereby Pd—Rh/$CeO_2$ catalyst was produced. In both catalysts, the noble metals were supported in the following amounts: Pd at 1.51% by mass and Rh at 0.25% by mass. Six types of filter substrates (supports) differing in average pore diameter, half-width, and porosity were used. The filter substrates were in a size of φ118.4×91 mm, and had a volume of 1 L.

Next, the Pd—Rh/$Al_2O_3$ catalyst and the Pd—Rh/$CeO_2$ catalyst in equal amounts were mixed with each other, water and a binder were added and mixed, and the resultant mixture was milled using a ball mill, whereby a slurry was prepared. In the Examples and Comparative Examples, the slurry viscosity was adjusted by varying an amount of water added in the preparation of the slurry. In addition, a catalyst supporting step to be described later was carried out under conditions with different slurry suction pressures, whereby catalyst-supporting GPFs having a high density layer of the catalyst at different positions were prepared. Table 1 shows the specifications of the filter substrates, the positions of the high density layers of the exhaust purification catalyst (TWC), and ratios of the catalyst of the high density layer. FIGS. 5 to 16 each show an image of a cross section of the respective GPF according to the Examples and Comparative Examples.

As Examples 1 to 9 and Comparative Examples 1 to 3, the above-described TWC in a WC amount of 60 g/L was supported onto the respective filter substrate by the piston-push-up process, while the inflow-side end face of the respective filter substrate was used as an inlet of the slurry. Thereafter, following drying at 150° C. with an airflow, sintering was performed at 600° C., whereby the respective GPF was produced.

TABLE 1

|  | Median Pore Diameter (μm) | Half-Width (μm) | Porosity (%) | Position of High Density Layer of Catalyst | (Ratio of Catalyst of High Density Layer) |
|---|---|---|---|---|---|
| Example 1 | 22 | 9 | 66 | Surface Layer (Outlet Side) | 50% |
| Example 2 | 22 | 9 | 68 | Surface Layer (Outlet Side) | 50% |
| Example 3 | 24 | 9 | 63 | Non-Uniform Distribution (25% from Outlet Side) | 66% |
| Example 4 | 24 | 9 | 63 | Non-Uniform Disitribution (25% from Outlet Side) | 75% |

TABLE 1-continued

| | Median Pore Diameter (μm) | Half-Width (μm) | Porosity (%) | Position of High Density Layer of Catalyst | (Ratio of Catalyst of High Density Layer) |
|---|---|---|---|---|---|
| Example 5 | 24 | 10 | 64 | Non-Uniform Distribution (25% from Inlet Side) | 66% |
| Example 6 | 18 | 8.8 | 63 | Non-Uniform Distribution (25% from Inlet Side) | 66% |
| Example 7 | 22 | 13.4 | 60 | Non-Uniform Distribution (25% from Inlet Side) | 75% |
| Example 8 | 22 | 13.4 | 60 | Non-Uniform Distribution (25% from Outlet Side) | 75% |
| Example 9 | 22 | 13.4 | 60 | Surface Layer (Outlet Side) | 50% |
| Comparative Example 1 | 24 | 10 | 64 | Uniform Distribution | 25% |
| Comparative Example 2 | 25 | 16 | 64 | Surface Layer (Outlet Side) | 75% |
| Comparative Example 3 | 25 | 16 | 64 | Non-Uniform Disitribution (25% from Inlet Side) | 66% |

[Particulate Matter Collection Test Using Actual Vehicle]

Each of the GPFs according to the Examples and Comparative Examples was tested in a vehicle equipped with a direct-injection gasoline engine having a displacement of 1.5 L. Specifically, each GPF to be tested was placed behind a three-way catalyst with a volume of 1 L disposed directly under the engine, and the vehicle traveled in the Worldwide harmonized Light duty driving Test Procedure (WLTP) mode, at an ambient temperature of 25° C. and a humidity of 50%. The number of PM (PN) was then measured at locations before and after the GPF, and a collection efficiency (a reduction rate) was calculated. Prior to the measurement, a pretreatment was carried out in the following manner. The vehicle traveled for one cycle of the WLTP. After particulate matter remaining on the GPF was removed, soaking was carried out for 24 hours at an ambient temperature of 25° C. The measurement was started in a cold condition, thereby obtaining the data.

[Post-Ash Deposition Pressure Loss Test]

The GPFs of the Example and Comparative Example were subjected to an endurance test using gypsum as simulated ash. Specifically, gypsum was first calcined, and then, milled until its particle size became approximate to that of actual ash. Next, endurance in actual traveling was simulated by causing the filter substrate to suction a predetermined amount of the simulated ash, using a self-made suction device (including a large dry pump (with a designed displacement of 1850 L/min) connected to a tank and performing evacuation). The amount of ash deposition was set to 150 g.

[Pressure Loss]

A pressure loss of each of the GPFs of the Examples and Comparative Examples was measured using a catalyst support pressure loss tester manufactured by Tsukubarikaseiki. Specifically, the GPF in full size (φ118.4×91 mm) was set, and air was caused to flow at a flow rate of 2.17 m³/min (COLD FLOW), whereby the pressure loss was measured.

[Discussion]

For each GPF, a relationship between the PN collection efficiency (reduction rate) and the post-ash deposition pressure loss is shown in FIG. 17. In FIG. 17, a range in which the PN collection efficiency (reduction ratio) and the post-ash deposition pressure loss as characteristics required for a GPF for use in an actual vehicle are both compatibly achieved is defined by a PN collection efficiency (reduction ratio) of 65% or greater and a post-ash deposition pressure loss of 4000 Pa or less. It was confirmed that only Examples 1 to 9 can compatibly achieve both the required characteristics. Further, when a more preferable range where the characteristics are both compatibly achieved is defined by a PN collection efficiency (reduction rate) of 75% or greater and a post-ash deposition pressure loss of 3500 Pa or less, it was confirmed that only Examples 1 to 6 can compatibly achieve both the required characteristics. When a further more preferable range where the characteristics are both compatibly achieved is defined by a PN collection efficiency (reduction rate) of 80% or greater and a post-ash deposition pressure loss of 2500 Pa or less, it was confirmed that only Examples 1 to 4 can compatibly achieve both the required characteristics.

From Table 1, the features of the specifications of Examples 1 to 9 can be construed as follows: the median pore diameter of the respective filter substrate is relatively large, while the respective half-width representing a degree of sharpness of the pore distribution is smaller than those of Comparative Examples 2 and 3. It can be appreciated that the filter substrates are characterized by a large median of the pore diameters and high sharpness of the pore distribution.

In comparison with Comparative Example 1, a state in which the TWC of Examples 1 to 9 was supported is characterized by a locally high density of the TWC. The TWC of Examples 1 to 9 was supported at a high density in a portion of the filter substrate in the thickness direction (a portion constituting 25% of the thickness from the inlet side or outlet side, or a surface layer).

Based on the foregoing, the following mechanism can be estimated from the specifications of GPF substrates and the characteristic of the state in which the catalyst was supported. General knowledge is that using a filter substrate having a large average pore diameter can reduce a pressure loss. In Comparative Examples 2 and 3, the average pore diameter is the same or similar to those of Examples, but the half-width is large and the distribution of pore diameters is wide. This configuration cannot ensure uniformity of exhaust flow when the exhaust flows into the partition wall, making it likely for the pressure loss to increase. Further, the presence of many small pores is indicated. It is also presumed that the catalyst preferentially flows into the small pores during the preparation of the catalyst, resulting in blockage of flow paths of the exhaust and a decrease in the number of the flow paths of the exhaust. For these reasons, it is estimated that the exhaust flows through the partition wall at a high speed, the pressure loss is likely to increase, and the particulate matter easily escapes.

Examples 1 to 9 are characterized by not only the filter substrate having a sharp pore distribution, but also the catalyst that is concentratedly supported in the form of a layer on a surface or in a specific portion of the partition wall. This feature can ensure uniformity of the exhaust flow, and can inhibit the catalyst from being supported preferentially in the small pores at the time of preparation of the catalyst. That is, Examples 1 to 9 can reduce an increase in pressure loss, in comparison with Comparative Examples 1 to 3. Further, since the TWC is concentratedly supported in the form of a layer in a specific portion in the partition wall or on a surface of the partition wall, it is ensured that the particulate matter-containing exhaust is caused to pass through the flow paths narrowed by the supported TWC, so that high particulate matter-filtering performance and high gas purification performance can be achieved.

EXPLANATION OF REFERENCE NUMERALS

1: Engine (Internal Combustion Engine)
2: Exhaust Purification Device
3: Exhaust Pipe (Exhaust Passage)
32: GPF (Exhaust: Purification Filter)
32a: Inflow-Side End Face
32b: Outflow-Side End Face
33: TWC (Exhaust Purification Catalyst)
320: Filter Substrate
323: Partition Wall
321: Inflow Cell
322: Outflow Cell
324: Inflow-Side Plug Member
325: Outflow-Side Plug Member
331: High Density Layer
332: Low Density Layer

The invention claimed is:

1. An exhaust purification filter installable in an exhaust passage of an internal combustion engine, the exhaust purification filter purifying exhaust of the internal combustion engine by filtering particulate matter contained in the exhaust, and comprising:
a filter substrate including a plurality of cells that extend from an inflow-side end face corresponding to inflow of the exhaust to an outflow-side end face corresponding to outflow of the exhaust, and that are partitioned and defined by a porous partition wall, the plurality of cells including an inflow cell that has a plugged opening at the outflow-side end face and an outflow cell that has a plugged opening at the inflow-side end face, the inflow cell and the outflow cell being arranged alternately with each other; and
an exhaust purification catalyst supported on the partition wall,
wherein the filter substrate has a median pore diameter (D50) by volume equal to or greater than 18 μm,
wherein the filter substrate has a half-width of pore distribution ranging from 7 μm to 15 μm,
wherein the exhaust purification catalyst is non-uniformly distributed and supported in a high density layer in which the exhaust purification catalyst is disposed at a relatively high density and a low density layer in which the exhaust purification catalyst is disposed at a relatively low density,
wherein the high density layer is disposed within the partition wall,
wherein the high density layer is one of four layers formed by dividing the partition wall in a thickness direction into four equal parts, and
wherein the high density layer includes the exhaust purification catalyst in an amount constituting 50% by mass or more of a total amount of the exhaust purification catalyst supported on the partition wall.

2. The exhaust purification filter according to claim 1, wherein the high density layer is one of the four layers that is closest to an outlet side of the partition wall, the outlet side allowing the exhaust that has flowed into the partition wall to flow out.

3. The exhaust purification filter according to claim 1, wherein the half-width of the pore distribution of the filter substrate ranges from 7 μm to 9 μm.

4. The exhaust purification filter according to claim 1, wherein the filter substrate has a porosity equal to or greater than 63%.

5. The exhaust purification filter according to claim 1, wherein the median pore diameter (D50) by volume of the filter substrate is equal to or greater than 20 μm.

6. The exhaust purification filter according to claim 1, wherein the exhaust purification catalyst is a three-way catalyst, and the exhaust purification filter is a GPF.

* * * * *